(12) United States Patent
Nocham et al.

(10) Patent No.: US 11,933,982 B2
(45) Date of Patent: Mar. 19, 2024

(54) MANAGING DISPLAYED INFORMATION ACCORDING TO USER GAZE DIRECTIONS

(71) Applicant: Elbit Systems Ltd., Haifa (IL)

(72) Inventors: Itamar Nocham, Haifa (IL); Avner Shahal, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 16/066,137

(22) PCT Filed: Dec. 28, 2016

(86) PCT No.: PCT/IL2016/051390
§ 371 (c)(1),
(2) Date: Jun. 26, 2018

(87) PCT Pub. No.: WO2017/115365
PCT Pub. Date: Jul. 6, 2017

(65) Prior Publication Data
US 2019/0346678 A1    Nov. 14, 2019

(30) Foreign Application Priority Data
Dec. 30, 2015 (IL) .......................................... 243422

(51) Int. Cl.
  *G02B 27/01* (2006.01)
  *G06F 3/01* (2006.01)
  (Continued)

(52) U.S. Cl.
  CPC .......... *G02B 27/017* (2013.01); *G06F 3/013* (2013.01); *G06F 3/0412* (2013.01);
  (Continued)

(58) Field of Classification Search
  CPC ................................................... G02B 27/017
  See application file for complete search history.

(56) References Cited

U.S. PATENT DOCUMENTS 9,057,874 B2    6/2015  Seder et al.
2004/0046711 A1*  3/2004  Triebfuerst .......... G05B 19/409
                                                345/8
(Continued)

FOREIGN PATENT DOCUMENTS

CA    2847975 A1    3/2013
EP    0330147        8/1989
(Continued)

OTHER PUBLICATIONS

Office action of IL Application No. 243422, dated Jun. 1, 2016.
(Continued)

*Primary Examiner* — Towfiq Elahi
*Assistant Examiner* — Andrew B Schnirel
(74) *Attorney, Agent, or Firm* — PEARL COHEN ZEDEK LATZER BARATZ LLP

(57) ABSTRACT

Methods and systems are provided for using a user's line of sight (LOS) and/or gaze direction to enhance displayed data and control various displays and instruments. The user's LOS is tracked, corresponding element(s) in a scene at which the user gazes are identified, e.g., in a database, and respective displayed data are enhanced or otherwise manipulated with respect to the identified element(s). The database may be multilayered and may comprise data layers which are conformal to a scene representation. Users may also select, using their LOS, among multiple layers of information and among multiple displayed parts to enhance or attenuate respective layers or parts. Designated elements may be real-world elements, displayed elements or instruments in the operational surroundings of the user. Identification of elements at which LOSs of multiple users are aimed at may be used for exchange of information among the users.

18 Claims, 12 Drawing Sheets

(51) Int. Cl.
  *G06F 3/041*     (2006.01)
  *G06F 3/04812*   (2022.01)
  *G06F 3/0484*    (2022.01)
  *G06F 16/29*     (2019.01)
  *G06T 19/00*     (2011.01)
  *H04W 4/029*     (2018.01)

(52) U.S. Cl.
  CPC ........ *G06F 3/0416* (2013.01); *G06F 3/04812* (2013.01); *G06F 3/0484* (2013.01); *G06F 16/29* (2019.01); *G06T 19/006* (2013.01); *H04W 4/029* (2018.02); *G02B 2027/0187* (2013.01); *G02B 2027/0198* (2013.01)

(56) References Cited

U.S. PATENT DOCUMENTS

| | | | |
|---|---|---|---|
| 2007/0030211 A1* | 2/2007 | McGlone | B63B 43/00 345/7 |
| 2007/0205963 A1* | 9/2007 | Piccionelli | G09F 9/00 345/7 |
| 2009/0112469 A1* | 4/2009 | Lapidot | G01C 23/00 701/469 |
| 2010/0079369 A1* | 4/2010 | Hartmann | G06F 3/0416 345/156 |
| 2010/0226535 A1 | 9/2010 | Kimchi et al. | |
| 2012/0127422 A1* | 5/2012 | Tian | G02C 7/081 351/158 |
| 2014/0132629 A1 | 5/2014 | Pandey et al. | |
| 2014/0145931 A1 | 5/2014 | Kim et al. | |
| 2014/0152792 A1* | 6/2014 | Krueger | A61B 5/4863 348/78 |
| 2014/0198129 A1* | 7/2014 | Liu | G06F 3/04815 345/633 |
| 2015/0022553 A1* | 1/2015 | Bono | G06T 11/60 345/634 |
| 2015/0268739 A1* | 9/2015 | Sanaullah | G06F 3/038 345/168 |
| 2015/0363979 A1 | 12/2015 | Takano et al. | |
| 2016/0313816 A1* | 10/2016 | Krishnakumar | G06F 3/03547 |
| 2017/0307889 A1* | 10/2017 | Newman | G02B 27/017 |

FOREIGN PATENT DOCUMENTS

| | | |
|---|---|---|
| WO | WO 2013/033842 | 3/2013 |
| WO | WO 2014/110437 | 7/2014 |
| WO | WO 2014/197409 | 12/2014 |
| WO | WO 2015/059773 | 4/2015 |

OTHER PUBLICATIONS

Extended European Search Report for European Patent Applicant No. 16881410.1, dated May 14, 2019.
Office Action for Canadian Patent Application No. 3,010,263, dated Jun. 21, 2019.
Office Action for Canadian Patent Application No. 3,010,263 dated Jul. 13, 2018.
Office Action for Canadian Patent Application No. 3,010,263, dated Feb. 21, 2020.

* cited by examiner

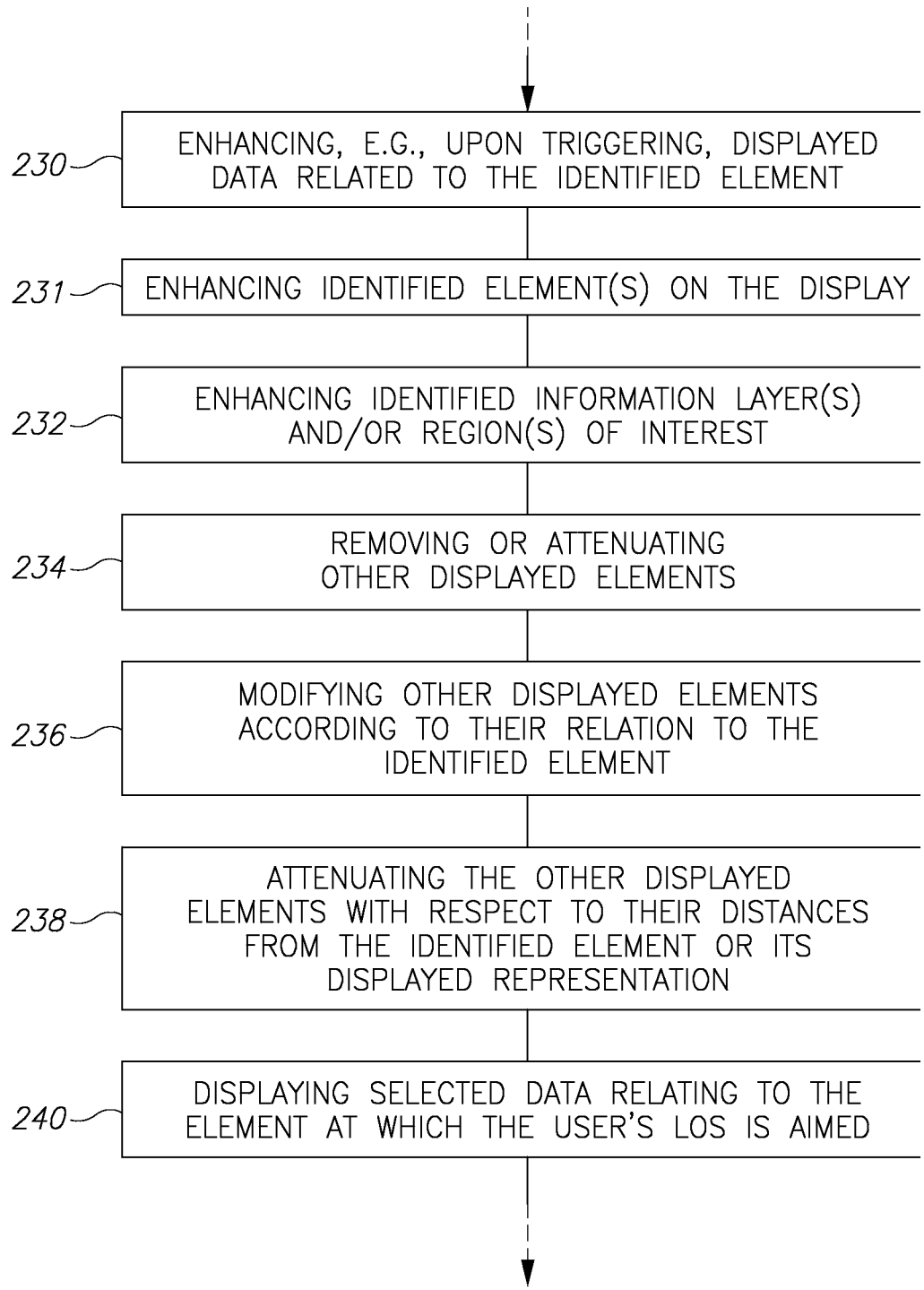
Figure 10 (cont. 1)

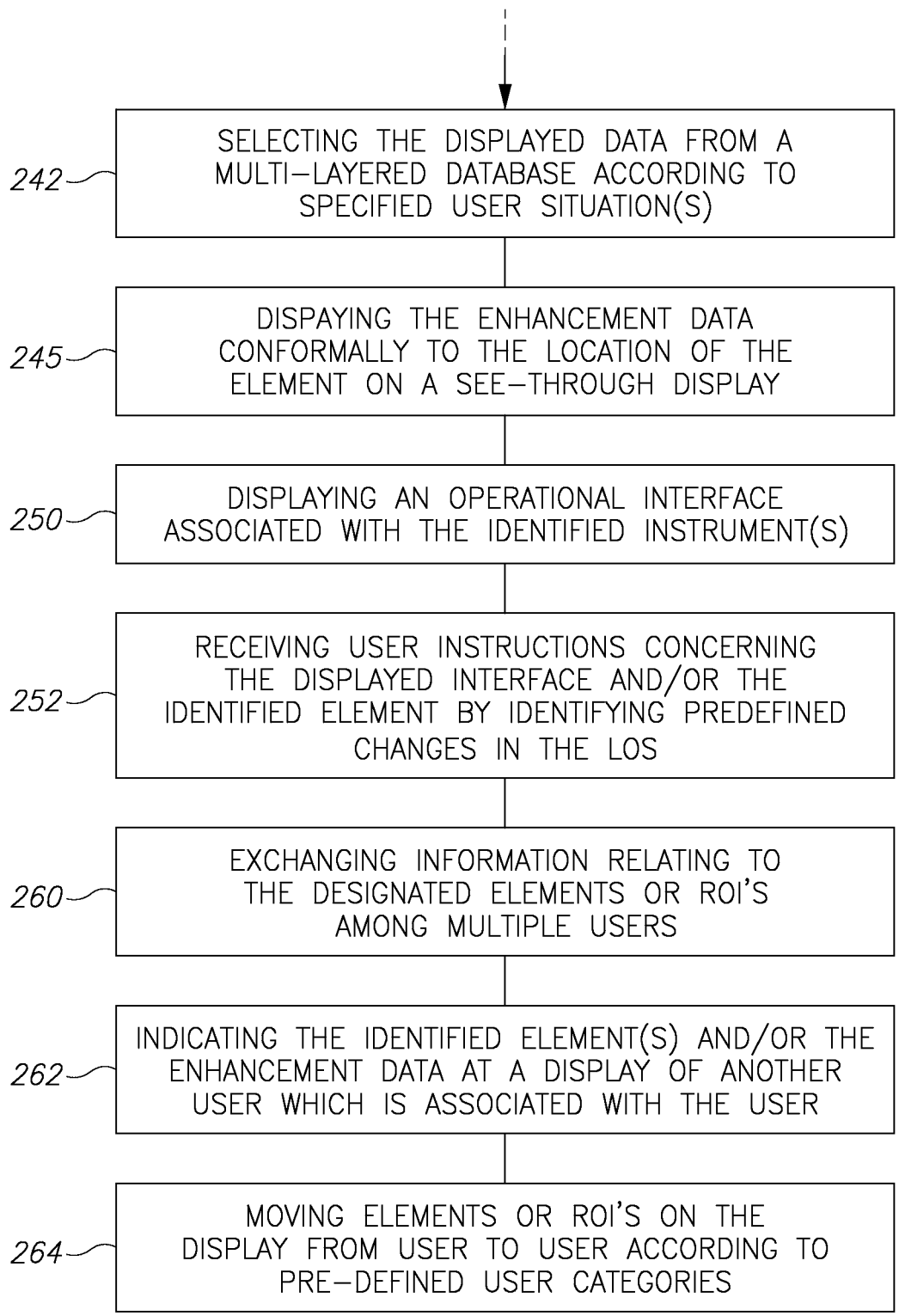
Figure 10 (cont. 2)

MANAGING DISPLAYED INFORMATION ACCORDING TO USER GAZE DIRECTIONS

CROSS-REFERENCE TO RELATED APPLICATIONS

This application is a National Phase Application of PCT International Application No. PCT/IL2016/051390, International Filing Date Dec. 28, 2016, entitled "MANAGING DISPLAYED INFORMATION ACCORDING TO USER GAZE DIRECTIONS", published on Jul. 6, 2017 under Publication No. WO 2017/115365, which claims priority of Israel Patent Application No. 243422, filed Dec. 30, 2015, all of which are hereby incorporated by reference in their entireties

BACKGROUND OF THE INVENTION

1. Technical Field

The present invention relates to the field of user-display interaction, and more particularly, to using the user's gaze direction to increase the relevance of the displayed information.

2. Discussion of Related Art

Displays of aircrafts and of vehicles, as well as stationary displays of various control centers (e.g., air control centers, unmanned aircraft control centers, traffic control centers, lookout control systems, border controls, rescue systems etc.) commonly include a large amount of data.

The clutter of these displays presents a significant challenge to users such as drivers or pilots. Due to the very high complexity level of the displayed information, focusing on, handling and reacting to relevant data is difficult.

The following patents and patent applications are incorporated herein by reference in their entirety: WIPO Publication No. 14197409, which teaches visual enhancements based on eye tracking; U.S. Pat. No. 9,057,874, which teaches virtual cursor for road scene object selection on full windshield head-up display; and European Patent Document No. EP0330147, which teaches aircraft helmet pointing angle display symbology.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a system comprising a database comprising a representation of a scene and at least one data layer that is conformal to the scene representation, and a control unit comprising a LOS tracker configured to track a user's LOS with respect to the scene, wherein the control unit is configured to identify an element in the scene representation at which the user's LOS is aimed and to display, via a display control, enhancement data relating to the element.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout. In the accompanying drawings.

DETAILED DESCRIPTION OF THE INVENTION

Figure 1:
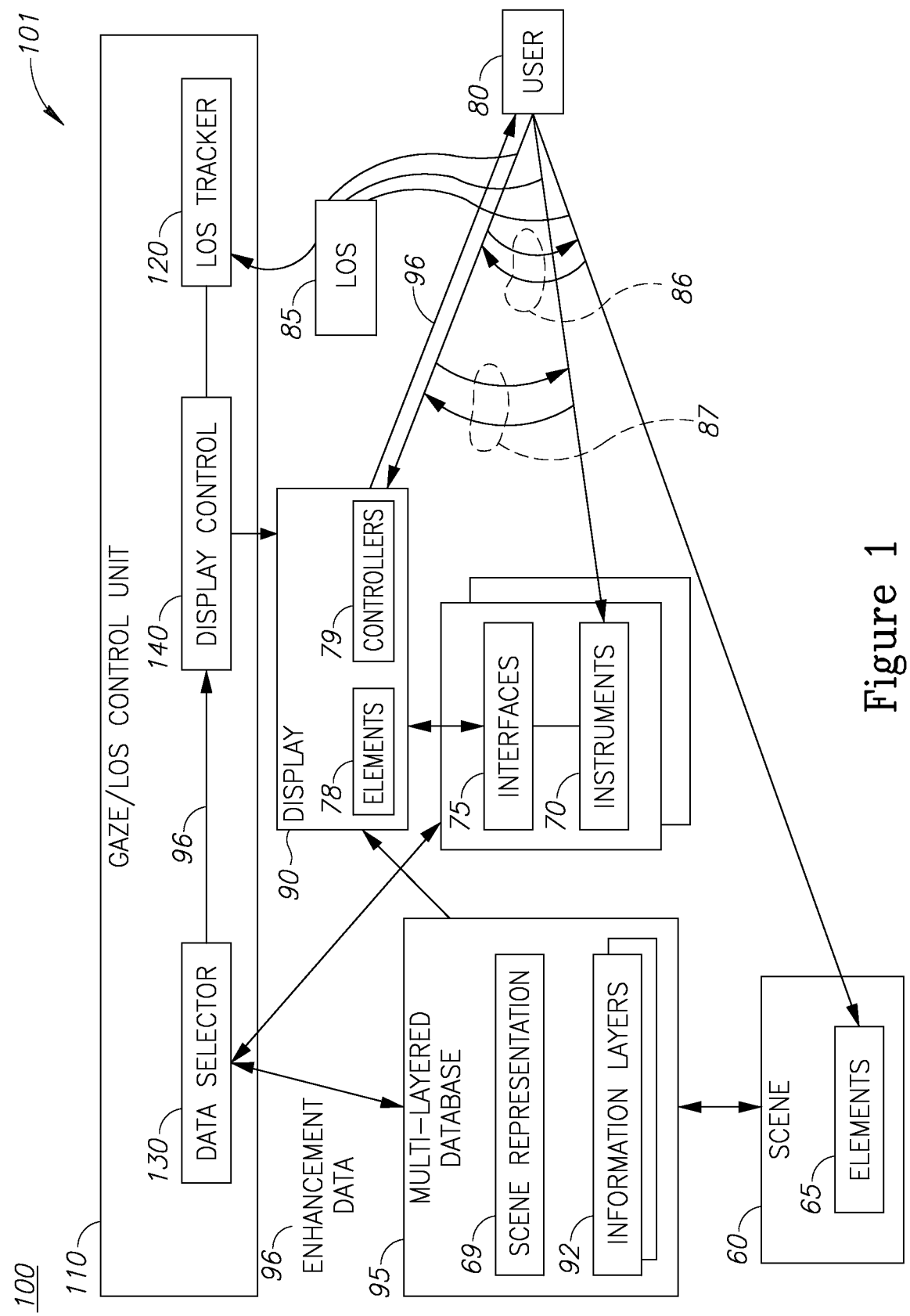
FIG. 1 is a high level schematic block diagram of a system, according to some embodiments of the invention.

Prior to the detailed description being set forth, it may be helpful to set forth definitions of certain terms that will be used hereinafter.

The term "enhance" as used in this application with respect to displayed elements refers to any modification of the displayed element and/or its surrounding that make the displayed element more prominent and/or augment the information content associated therewith, such as changes to visual parameters of the element (e.g., increased size, brightness, different color, blinking etc.), attenuation of the element's surrounding (e.g., dimming, removing or spacing surrounding elements) and display of additional information related to the displayed element by visual or non-visual means (e.g., presentation of additional data or symbols relating to the element, auditory information).

The term "Element of Interest (EOI)" as used in this application refers to any element to which a user can refer, including e.g., real-world elements such as structures and objects, displayed elements such as controllers, icons and regions on the display, and various instruments in the operational environment of the user (e.g., cockpit instruments in case of the user as a pilot). The term "Region of Interest (ROI)" as used in this application refers to any region on a display that may be referred to by the user.

The terms "line of sight (LOS)" and "gaze" as used in this application refer to any direction associated with a user's head, such as a head orientation or a gaze direction. As non-limiting examples, LOS or gaze trackers may be incorporated in a head mounted display (HMD), e.g. in a helmet, a visor, glasses etc. or may be associated or independent units. Specifically, the term "LOS" as used in this application refers to a direction associated with a user's head, such as a gaze direction, a head orientation or a combination thereof. It is noted that while the LOS may be tracked with respect to a moving platform, such as a vehicle, in relative, vehicle coordinates; and a conversion may be needed to express the LOS in absolute, world coordinates, the present application assumes this conversion is straightforward and does not distinguish, unless specifically discussing the conversion, between LOS in relative and absolute coordinates.

The term "display element" as used in this application refers to any element on a display, such as an image of a specific object or a part thereof, a scene or a part thereof, any number of symbols or icons, specified areas or apparent volumes on the display, and so forth. Display elements may vary in size and form and may include any number of objects or object parts.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways. Also, it is to be understood that the phraseology and terminology employed herein is for the purpose of description and should not be regarded as limiting.

Methods and systems are provided for using a user's line of sight (LOS) and/or gaze direction to enhance displayed data and control various displays and instruments. The user's LOS is tracked, corresponding element(s) in a scene at which the user gazes are identified, e.g., in a database, and respective displayed data are enhanced or otherwise manipulated with respect to the identified element(s). The database may be multilayered and may comprise data layers which are conformal to a scene representation. Users may also select, using their LOS, among multiple layers of information and among multiple displayed parts to enhance or attenuate respective layers or parts. Designated elements may be real-world elements, displayed elements or instruments in the operational surroundings of the user. Identification of elements at which LOSs of multiple users are aimed at may be used for exchange of information among the users.

FIG. 1 is a high level schematic block diagram of a system 100, according to some embodiments of the invention. System 100 comprises a gaze/LOS control unit 110 and a LOS (e.g., gaze) tracker 120 and may be integrated in a range of operation contexts to enable users to select objects and information related thereto, select and receive information, select interfaces, control interfaces etc. using their gaze direction as detected by system 100. A data selector 130 may be configured to select data for display according to predefined rules relating to user LOS (e.g., gaze directions) 85 and changes 86, 87 thereof. The selected data or information associated therewith may be displayed via display control 140. For example, changes 86, 87 of user LOS 85 may be used as triggers to select elements 65 in scene 60 and/or to select instruments 70 for interface presentation, respectively.

In certain embodiments, additional control (e.g., tactile controls) may be used in addition to gaze directions to provide additional control options.

System 100 may be configured to use the direction of the user's gaze (e.g., a pilot's gaze direction, determined e.g., by the line of sight or an eye tracker) in order to change symbology depiction levels on respective displays and enable designation of elements on the display. The designation may be carries out according to any predefined criteria, such as direction of gaze, duration of a gaze at a specified direction or at a predefined vicinity of a specified direction, spatio-temporal patterns of gaze directions etc., and may be adapted to specific situations, and user instructions. It is noted that the term "symbology" is used herein to express the entirety of the graphical aspects of displayed data such as types of symbols, design of data items, configuration of the display etc. System 100 may be configured as a top-down system that enables the user to navigate through multi-layered information by selecting relevant layer(s) according to specified and/or changing situation(s) and to isolate specified information components to be displayed, in order to provide efficient use of the database by the user.

In certain embodiments, control unit 110 may be configured to identify an element 65 in a scene 60 at which a user's 80 LOS 85 is aimed, and to display, on a display 90 via display control 140, selected data (enhancement data 96) relating to element 65, which may be selected from multi-layered database 95 according to a specified user situation. Display 90 may be a see-through display and control unit 110 may be configured to identify element 65 such as elements of interest (EOI) in scene 60, which is gazed at through the see-through display, and display selected data relating to the EOI at which the user's LOS is aimed. The user's LOS aiming may be related to as designation of the respective element, or part of the display.

Database 95 may comprise a representation 69 of scene 60 and at least one data layer 92 that is conformal to scene representation 69. Control unit 110 may be configured to identify element 65 in scene representation 69 at which user's LOS 85 is aimed and to display enhancement data 96 relating to element 65. For example, element identification may be carried out with respect an interactive 3D (possibly holographic) map or an interactive SVS (Synthetic Vision Systems) display. User(s) may explore the SVS database with their gaze and/or LOS and gain an increased situational awareness without moving their eyes from the outside world.

The display of enhancement data 96 (note the transfer of enhancement data 96 e.g., from multi-layered database 95 via data selector 130, display control 140 and display 90 to user 80) may be conformal to a location of element 95 with respect to see-through display 90. For example, the displayed data or information (enhancement data 96) may be selected from a multi-layered database according to a specified user situation and/or may relate to received user instructions or definitions concerning the identified EOI. The conformity of the display of enhancement data 96 may be with respect to the position and orientation of the vehicle (e.g., aircraft), the HMD and/or the user's line of sight, possibly switchable by changes of the gaze direction, or according to predefined rules relating e.g., to operational situations.

Displayed information (enhancement data 96) may comprise any of: database information associated with the identified EOI, sensor data related to the identified EOI (e.g., from optical or electromagnetic sensors, as well as sensors of associated systems such as Traffic Alert And Collision Avoidance System (TCAS), Enhanced Vision System (EVS), various radars, etc.), surveillance data relating to the identified EOI (e.g., from an Automatic Dependent Surveillance Broadcast (ADSB) system), information relating to other EOI that are related to or associated with the identified EOI, and geographical information relating to the identified EOI (e.g., coordinates, Geographic Information System (GIS) data).

In certain embodiments, the displayed information may be selected from a multi-layered database according to a specified user situation and/or according to user definitions. For example, if a user gazes at a vehicle as element 65, control unit 110 may be configured to display data related to the vehicle. Control unit 110 may be further configured to receive user instructions concerning element 65 by identifying predefined changes (86) of LOS 85. Parameters and characteristics of the gazes and of the gaze changes may be defined as denoting specified information concerning the display and the handling of the gazed-at elements, e.g., relate to activation of associated operations, display features etc. Additional and related inputs may be received by other modalities, e.g., by tactile or auditory means. Control unit 110 may be further arranged to carry out the element identification with respect to predefined element characteristics and/or additional user input.

In certain embodiments, control unit 110 may be further configured to indicate identified element 65 and/or enhancement data 96 at a display of another user which is associated with user 80. The display and the other user are not illustrated, they may be equivalent to display 90 and user 80 or merely be interconnected therewith (e.g., other users may be at a control center that monitors the action of user 80).

Control unit 110 may be configured to remove, modify or attenuate displayed elements other than identified element 65 (e.g., background, displayed data or even reducing the visibility of other real world elements through display 90). Control unit 110 may be configured to receive user instructions concerning the identified element according to predefined changes of the LOS, e.g., of the gaze direction.

Control unit 110 may be configured to identify an instrument within a user's operational environment (as element 65 in scene 60 being e.g., a pilot's cockpit with user 80 being the pilot), at which user 80 gazes, to display an operational interface associated with the identified instrument and to receive user instructions concerning the identified element via the displayed operational interface.

In certain embodiments, control unit 110 comprises LOS tracker 120 configured to track user's (80) LOS 85 onto display 90. LOS tracker 120 and display 90 may be implemented in any way, e.g., as independent units and/or as wearable units, for example display 90 may be embodied as Head Up Display (HUD), Head Down Display (HDD), Head Mounted Display (HMD, wearable displays that relate to the user's point of view), down display, Near-To-Eye (NTE) display, any type of display such as Cathode Ray Tube (CRT), Liquid Crystal Display (LCD), Light Emitting Diodes (LED) display etc. as well as a virtual display such as augmented reality visors, and LOS tracker 120 may be independent or integrated within the respective displays. A corresponding display control 140 may be associated with display 90, integrated therewith or be provided as an independent unit, e.g., within control unit 110. It is emphasized that LOS tracker 120 and/or display control 140 may be part of control unit 110 or may be part of the controlled units and systems associated with the corresponding displays.

Control unit 110 may be configured to identify a displayed element 78 at which user 80 gazes, for example, identify a displayed controller 79, such as a button, a dial, etc. and activate a function associated with the gazed-at displayed controller 79. For example, in case of a button, respective operations may be executed upon the gazing of the user at the button. In another example, in case of a dial, respective adaptations may be executed to an operation that is associated with the dial. In certain embodiments, parameters of the user's gaze, such as duration or gaze movement patterns may be used to modify parameters associated with displayed controller 79. For example, a duration of the gaze may be used to indicate an intensity of execution of the associated operation, or reiterations of gazes at displayed controller 79 may be used to define a number of iterations of the associated operations.

Control unit 110 may be configured to identify a displayed element 78 at which user 80 gazes and to select or enhance identified element 78 on display 90 via display control 140. For example, displayed element 78 may comprise a symbol on display 90 (e.g., an icon, controller 79, an image etc.) which may be selected, activated enlarged etc., an information layer 92 in a multi-layered database 95, a region of interest on display 90 and/or an object on display 90. Control unit 110 may be further configured to modify, via display control 140, other displayed elements according to their relation to the identified element. In certain embodiments, control unit 110 may be configured to attenuate, via display control 140, the other displayed elements with respect to their distances from the identified element (see, e.g., FIGS. 9A and 9B below). For example, if a user gazes at a vehicle on display 90, control unit 110 may be configured to enhance the display of the vehicle, e.g., enlarge the vehicle image or increase its brightness, while dimming other, remote elements on display 90. In another example, if a user gazes at certain data on display 90, control unit 110 may be configured to display more elaborated data on the display of the vehicle and reduce the details presented for other elements on display 90.

One example for databases 95 comprises Digital Maps (DMAP), which are Two Dimensional (2D) maps that provide to the user(s) data regarding the terrain, aeronautical data, obstacles and additional data layers 92. Another example for databases 95 comprises interactive DMAPs in which a cursor on the DMAP allows the user(s) to point at a certain entity and to explore data related to the entity in the provided database of the DMAP. While prior art cursers are controllable via a Courser Control Device (CCD), in system 100 courser control may be at least partially implemented by control unit 110 according to the user's LOS 85. The tracked LOS 85 may be used to control the cursor at specified times or continuously, at specified regions of display 90 or over the whole display 90 Enhanced Vision Systems (EVS) may also be used as basis for system 100. Yet another example for databases 95 comprises Synthetic Vision Systems (SVS) which comprise 3D (three dimensional) maps that are conformal to the outside world and provide layers of terrain, obstacles and aeronautical data (such as airports, runway, navigation aids etc.). SVS's may be displayed both on various displays 90 such as HDD, HUD and HMD. In one example, the calculated LOS, or gaze direction, 85 of the user (e.g., a pilot) provided by the HMD may be used as LOS 85, as may be any kind of tracker related to the user (e.g., in the cockpit). A LOS calculation of HMD may be used as a curser device for pointing positions in the outside world, using the aircraft present position and the LOS calculation. System 100 may be configured to fuse the data presented to the user and the LOS or eye tracker calculation into a dynamic depiction of the symbology on display 90 (e.g., the HUD or HMD). For example, upon looking at an intruder symbol (i.e., when LOS 85 is towards the intruder symbol), a Traffic Collision Avoidance System (TCAS) symbol may be presented on display 90 accompanied by intruder data. Displaying the intruder data at the user's LOS and/or gaze direction may enable displaying less data than when the intruder data is displayed at the periphery of the vision. In certain embodiments, system 100 may be configured to fuse the SVS database (as database 95) and the LOS calculation (by LOS tracker 120) into an interactive 3D map or an interactive SVS display. User(s) may explore the SVS database with their gaze and gain an increased situational awareness without moving their eyes from the outside world.

In certain embodiments, control unit 110 may be configured to identify an instrument 70 at which user 80 gazes and to display, via display control 140, an operational interface 75 associated with identified instrument 70. In certain embodiments scene 60 may comprise the operation surroundings of user 80 (e.g., scene 60 comprising the cockpit in an aircraft with user 80 as the pilot, or augmenting element selection in scene outside the operational environment of the user) and comprise instruments 70 as elements 65 in scene 60. Control unit 110 may be further configured to receive user instructions concerning displayed interface 75 by identifying predefined changes (87) of LOS 85. In the example of user 80 as a pilot, various cockpit characteristics and instruments may be manipulated according to LOS 85, e.g., controls or displays may be engaged and specific interfaces such as instruments' operation menus and device control displays may be displayed upon the user looking at the respective instrument or device. Displayed symbology or elements may be masked when the pilot looks into the cockpit (or generally when the user gazes at instruments, other displays or any specified element). User 80 may mark element 65 by LOS and/or gaze direction, then indicate instrument 70 a another gaze, and control unit 110 may display a menu or interface 75 relating to instrument 70 on the display, e.g., in association with enhancement data 96 or independently thereof. Such embodiments may provide integration of a vehicle's (e.g. aircraft's) native system into display 90 in a natural and intuitive way. Operating interfaces 75 and instrument menus as well as their removal may be carried out similarly by gazing at different directions and/or during different periods according to predefined rules.

Certain embodiments may comprise a display system 101 comprising any of the disclosed control units 110 and display 90 such as a see-through display, with display control 140. Control units 110 may comprise only LOS tracker 120, or may comprise also display control 140 and/or data selector 130.

Figure 2A:
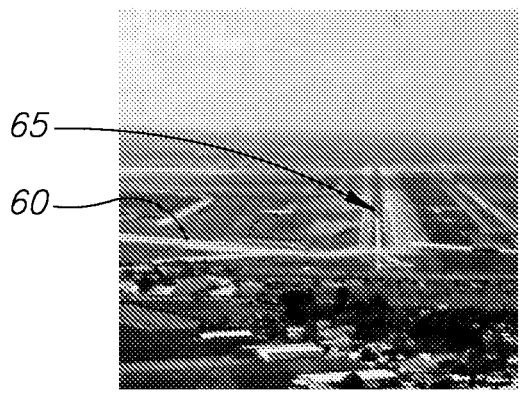
FIGS. 2A-2D are high-level schematic illustrations of a landing area and enhancement data, according to some embodiments of the invention.
Figure 2B:
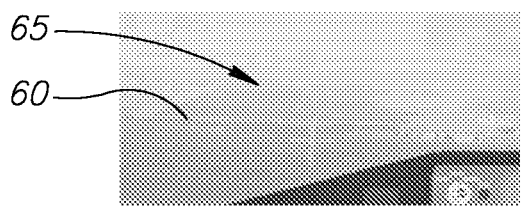
Figure 2C:
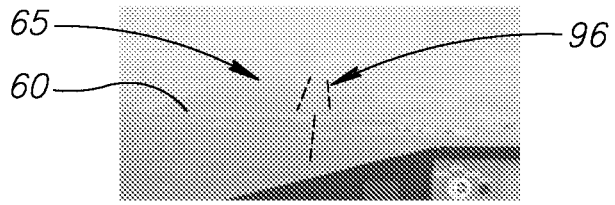
Figure 2D:
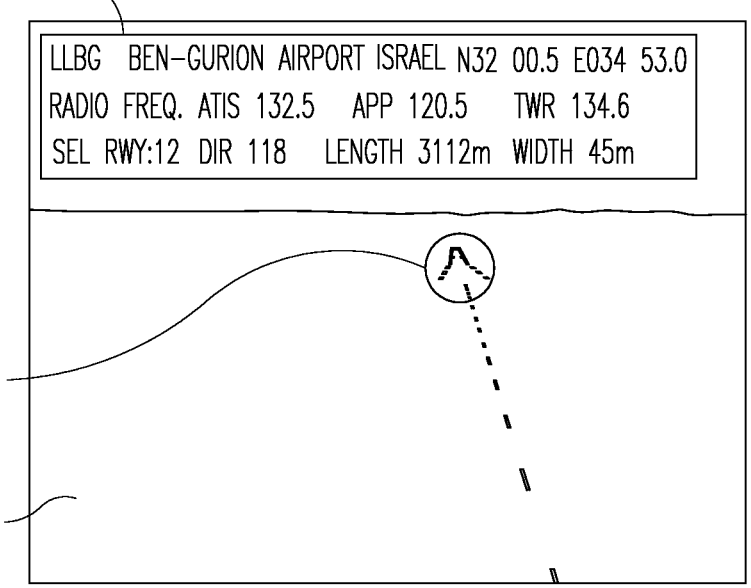

FIGS. 2A-2D are high-level schematic illustrations of a landing area as element 65 and enhancement data 96, according to some embodiments of the invention. FIG. 2A illustrates landing area 65 in scene 60 at good visibility conditions, FIGS. 2B and 2C illustrates landing area 65 at worse visibility conditions (e.g., due to fog), where it is barely visible, and FIG. 2D illustrates schematically a display with invisible landing area 65. Landing area 65 in scene 60 may be augmented by enhancement data 96 such as data relating to the position, the dimensions and/or the operational characteristics of landing area 65 (FIG. 2D), which may be displayed in association with landing area 65, possibly conformally with respect to the user's LOS (FIG. 2C). In certain embodiments, e.g., in bad weather or visibility conditions, enhancement data 96 may comprise the outline of the landing area and/or designation of geometrical features related thereto such as approach line and track designations, as illustrated by the broken lines in FIG. 2C as well as ellipse 65 in FIG. 2D denoting the position of the landing area. Depth markers may be part of enhancement data 96.

Figure 3:
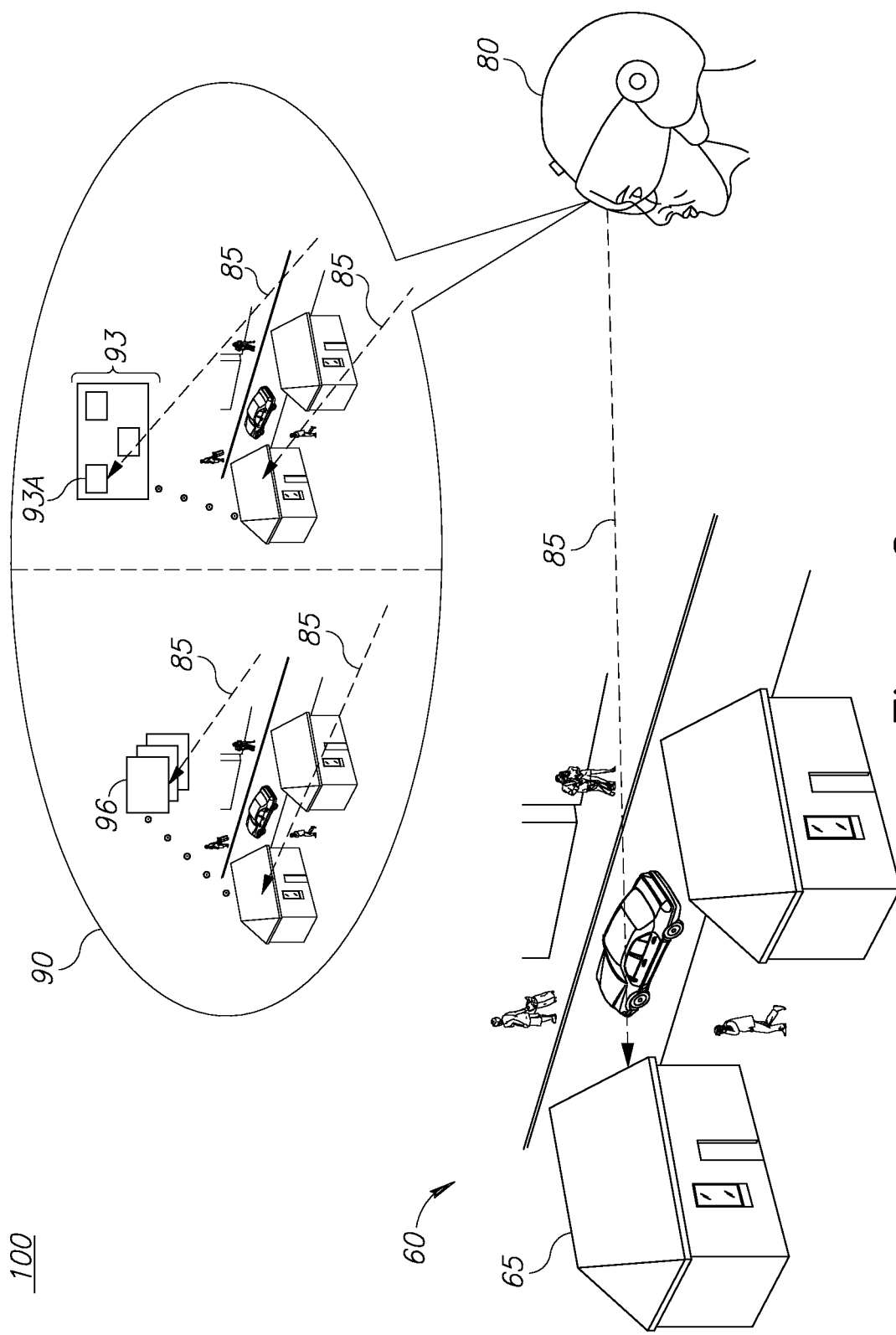
FIG. 3 is a high-level schematic illustration of system 100, according to some embodiments of the invention.
Figure 4A:
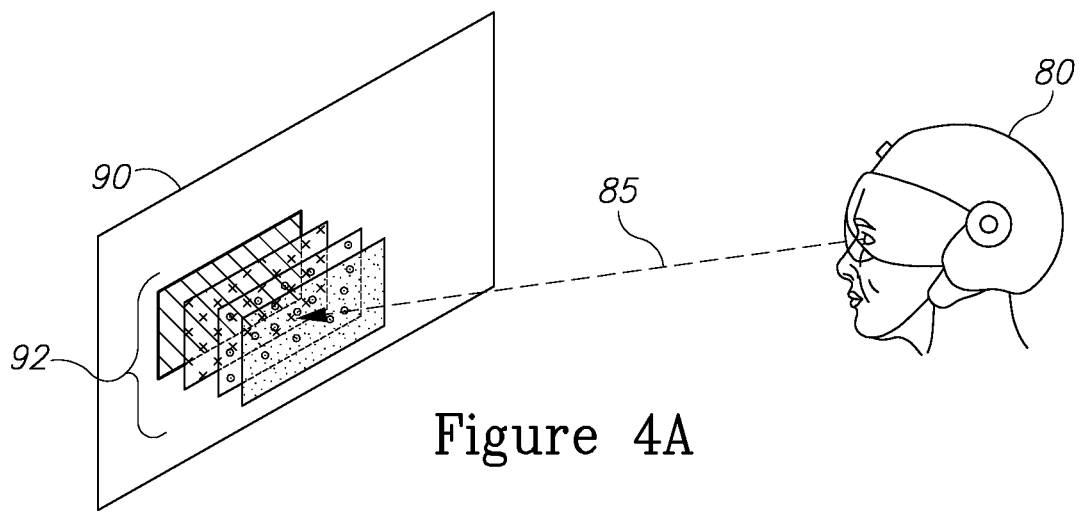
FIG. 4A is a high-level schematic illustration of a display with multiple layers of database information which are hidden in the background, according to some embodiments of the invention.
Figure 4B:
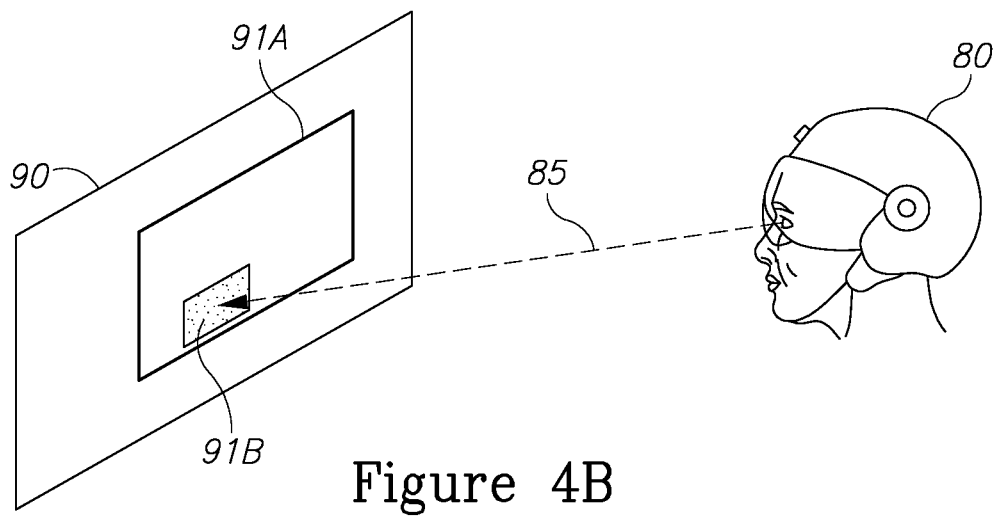
FIG. 4B is a high-level schematic illustration of enhanced regions of interest (ROIs), according to some embodiments of the invention.
Figure 4C:
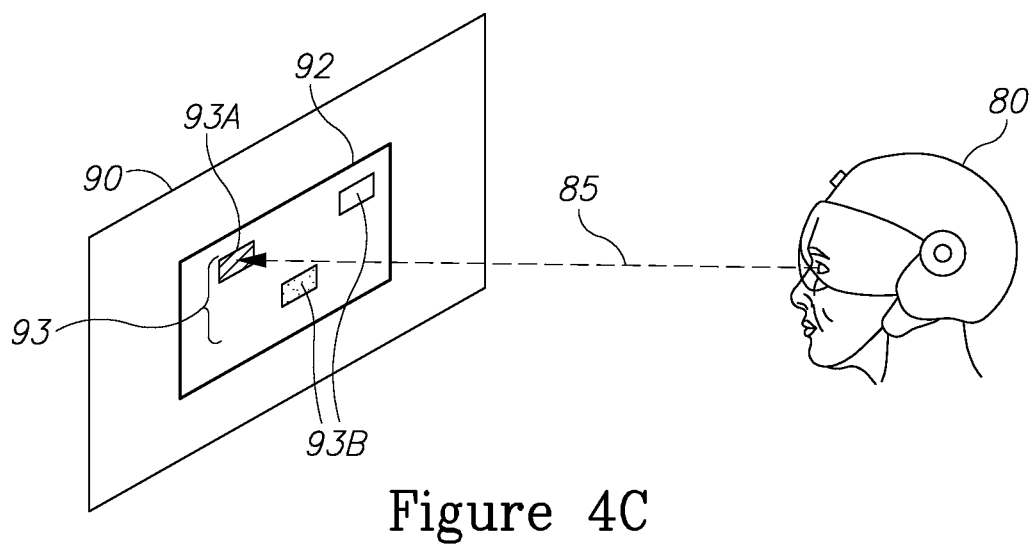
FIG. 4C is a high-level schematic illustration of enhanced objects, according to some embodiments of the invention.
Figure 5:
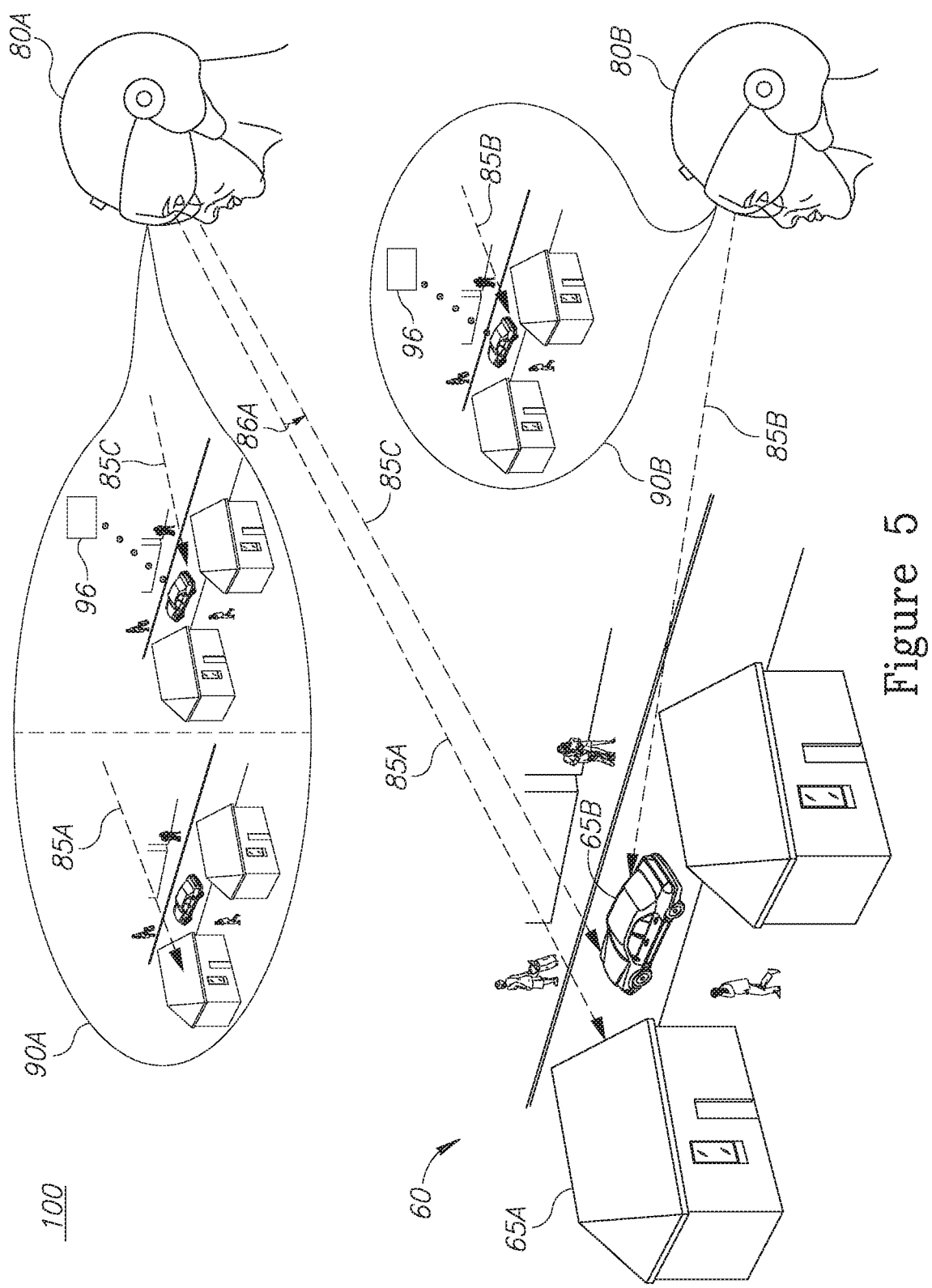
FIG. 5 is a high-level schematic illustration of the system with multiple users, according to some embodiments of the invention.
Figure 6:
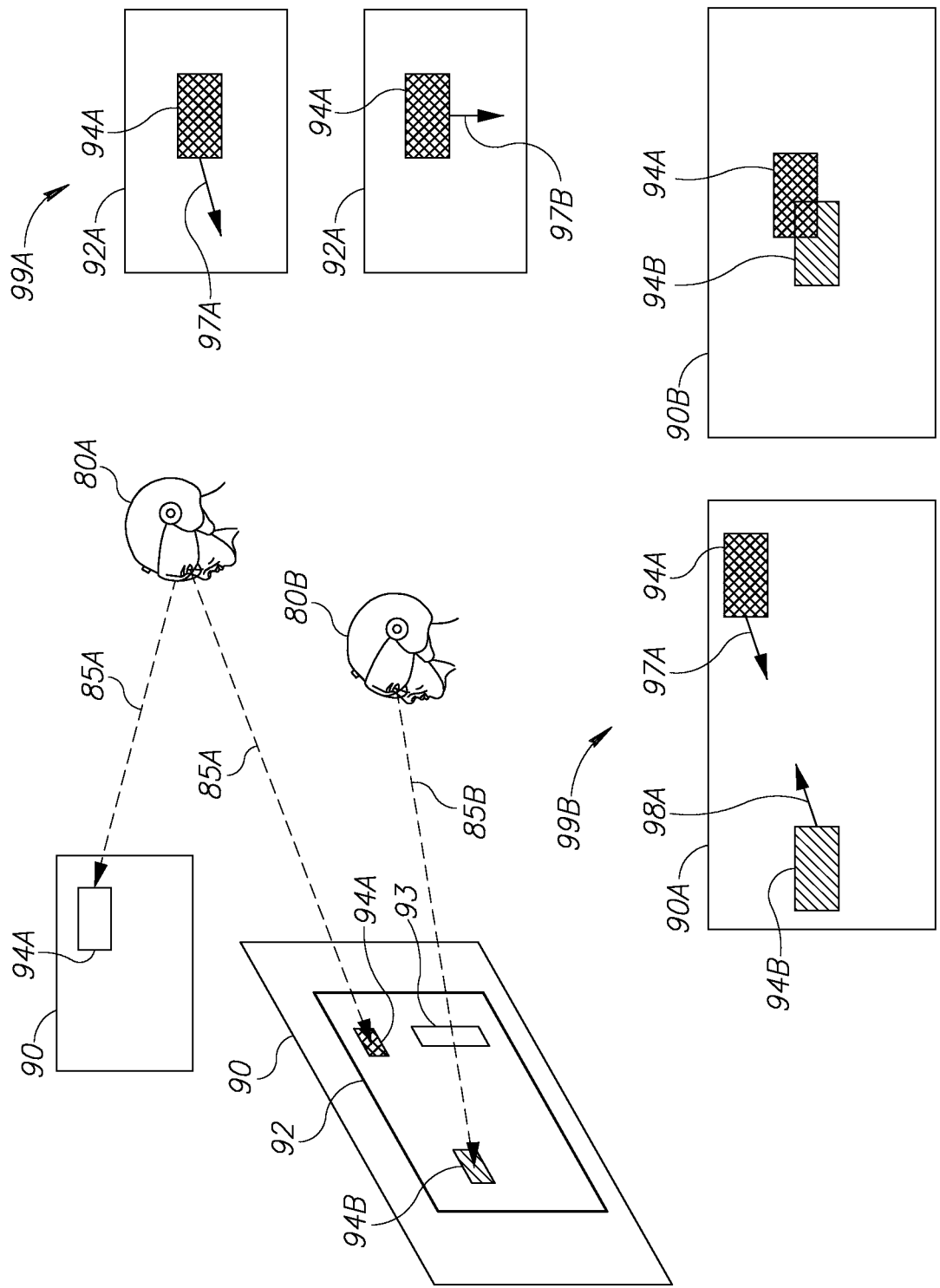
FIG. 6 is a high-level schematic illustration of interactions among several users, according to some embodiments of the invention.

Some of the operations of system 100 with respect to displays 90 are illustrated schematically in FIGS. 4A-4C, 6 and 8, while corresponding operations of system 100 with respect to the real word as scene 60 are illustrated schematically in FIGS. 3, 5 and 6, respectively, FIG. 3 is a high-level schematic illustration of system 100, according to some embodiments of the invention. FIG. 3 illustrates scene 60 with elements 65 such as houses, roads, vehicles, etc., which user 80 observes via e.g., an HMD with display 90 such as a see-through display. System 100, tracking user's LOS 85 (e.g., with respect to a user's operational environment), may provide additional data 96 related to LOS-designated element 65, e.g., a house in the figure (as illustrated on the left hand part of the illustration), and/or enable selection of specific data items or layers 93A from multiple data items of layer 93 (as illustrated on the right hand part of the illustration). The display of data 96 and/or 93, 93A may be conformal to scene 60 as viewed through the see-through display. System 100 may allow user 80 to receive or select data concerning element 65, search database 95 with respect to element 65, and designate additional data and/or elements to receive additional enhancement data 96.

FIG. 4A is a high-level schematic illustration of display 90 with multiple layers of information 92 from database 95 which are hidden in the background, according to some embodiments of the invention. Information layers may be selectable by directing LOS 85 to specified regions and/or be displayed to conform to LOS 85 of operator 80 so that the displayed information is adjusted into the correct perspective with respect to LOS 85. By tracking user modifications of LOS 85, control unit 110 may be configured to enable user 80 to carry out any of: selecting one or more layer 92, adjusting the intensity of each layer 92 according to importance (possibly with respect to a mission or according to predefined criteria), hiding or showing information layers 92, activating the layers to follow the gaze and enhancing a specific region of interest (ROI, as an example of an EOI) in the center of the LOS, selecting an object in the scene (e.g., an airport) to be activated and displayed, and/or navigating to the location of the object (e.g., by displaying arrows, enabling audio instructions such as voice commands etc.).

FIG. 4B is a high-level schematic illustration of enhanced ROIs 91B, according to some embodiments of the invention. LOS 85 may be used to display specific ROIs 91A in the LOS as ROIs 91B that may be configured to follow the user's gaze. In certain embodiments, specific enhanced objects or ROIs on display 90 (e.g., SVS) may be set as anchors that are conformal to the real world and may be used to re-adjust display 90 upon user request (after moving ROI 91B with the user's gaze). Control unit 110 may be configured to highlight objects and/or ROIs when LOS 85 is moving next to them and/or open related menus when LOS 85 is on them.

FIG. 4C is a high-level schematic illustration of enhanced objects 93A, according to some embodiments of the invention. One or more objects 93A in one or more information layer 92 on display 90 may be selected by directing LOS 85 thereto. Control unit 100 may be configured to enhance selected object(s) 93A and attenuate other object(s) 93B on display 90. Enhancement and attenuation may be carried out e.g., by increasing and reducing the brightness, the size or other graphical parameters of objects 93A, 93B respectively. Different objects 93 may be enhanced or dimmed according to the changing LOS as user 80 operates.

FIG. 5 is a high-level schematic illustration of system 100 with multiple users 80A, 80B, according to some embodiments of the invention. FIG. 5 illustrates scene 60 with elements such as houses, roads, vehicles, etc., which users 80A, 80B observe via e.g., HMD's with displays such as a see-through display. System 100, tracking the users' respective LOS's 85A, 85B, may enable user 80B direct user 80A's attention from element 65A observed by user 80A to element 65B observed by user 80A, i.e., cause to modify, 86A, LOS 85A into LOS 85C (the left hand side of display 90A illustrates the display prior to prompting, with LOS 85A, while the right hand side of display 90A illustrates the display after the prompting, with LOS 85C, possibly with enhancement data 96). Modification 86A may be prompted by system 100 using any means such as an alert (e.g., audio and/or visual), an arrow from displayed element 65A to displayed element 65B, in a see-through display, an arrow from the apparent location of element 65A on the display to the apparent location of displayed element 65B, a designation on display that relates to the position of element 65B etc. System 100 may allow multiple users designate elements 65 for each other, possibly under specified hierarchical rules Enhancement data 96 relating to elements 65 may be displayed to augment the designation sharing described above, e.g., in case of certain elements or certain users, specified enhancement data 96 may be displayed upon the prompting to LOS modification by system 100, possibly as the modification cue. Enhancement data 96 may be presented, selected and/or its visual display may be effected or controlled by LOS designations by either or both users 80A, 80B. For example, display effects may be carried out when both users designate by LOSs 85B, 85C the same real-world element. Changes of designation may control the type of enhancement data 96, its amount, position etc. Specified enhancement data 96 may be displayed upon triggering by any of various events such as a predetermined condition, specified element characteristics, a user activation, and specified tempo-spatial parameters of the users' LOSs (such as LOS designation) such as a same designation by two or more users on a same display or different displays (with respect to real-world elements and/or displayed elements). Triggering may alternatively or complementarily modify enhancement data content, change filters (e.g., when displaying overlapping enhancement data), etc.

In certain embodiments, system 100 may be configured to enable interaction between multiple users of display 90 or between multiple users of multiple displays 90, by monitoring the LOSs of the users. FIG. 6 is a high-level schematic illustration of interactions among several users, according to some embodiments of the invention. In one or more layers 92 on display(s) 90, one object 94A is in a gaze direction (or LOS) 85A of one user 80A and another object 94B is in a gaze direction (or LOS) 85B of another user 80B. As illustrated in section 99A of FIG. 6, user 80A may direct object 94A in the direction of object 94B (97A) or direct object 94A in the direction of a region of interest ROI 93 (97B). Other user(s) 80B may note the moving of object 94A due to the movement of gaze direction 85A and act accordingly (e.g., perform an action, note ROI 93 etc.). As illustrated in section 99B of FIG. 6, users 80A, 80B may direct (97A, 98A in display image 90A) respective objects 94A, 94B toward convergence, e.g., to a specified extent of convergence that defines a new ROI (in display image 90B), on one or more respective displays 90. The directing movements may operate respective devices and/or the extent of conversion may be translated into further data processing (e.g., definition of an object at the defined ROI). Such configurations of system 100 may be used, for example, to direct the gaze of user 80B to view the ROI of user 80A, or to direct user 80B to observe another information layer to increase the capacity of information on each object. Additional sharing of information may be carried out verbally or through system 100. Moreover, enhancement data 96 may be presented and movements 97A, 97B may be effected or controlled by LOS designations by either or both users (e.g., convergence may be carried out when both users designate the same real-world element).

In certain embodiments, control unit 110 may comprise LOS (e.g., gaze) tracker 120 configured to track LOS 85 of multiple users 80 (e.g., 80A, 80B) with respect to display 90, with control unit 110 configured to identify corresponding elements 78 (e.g., ROI's 94A, 94B) at which users 80 gaze and exchange information relating to the gazed-at elements among the users. For example, the exchange of information may be carried out according to pre-defined user categories. Control unit 110 may be further configured to exchange information among users 80 by moving elements (or ROI's) 78 on display 80, gazed-at by a first user, towards a gazed-at region on the display of a second user.

Figure 7:
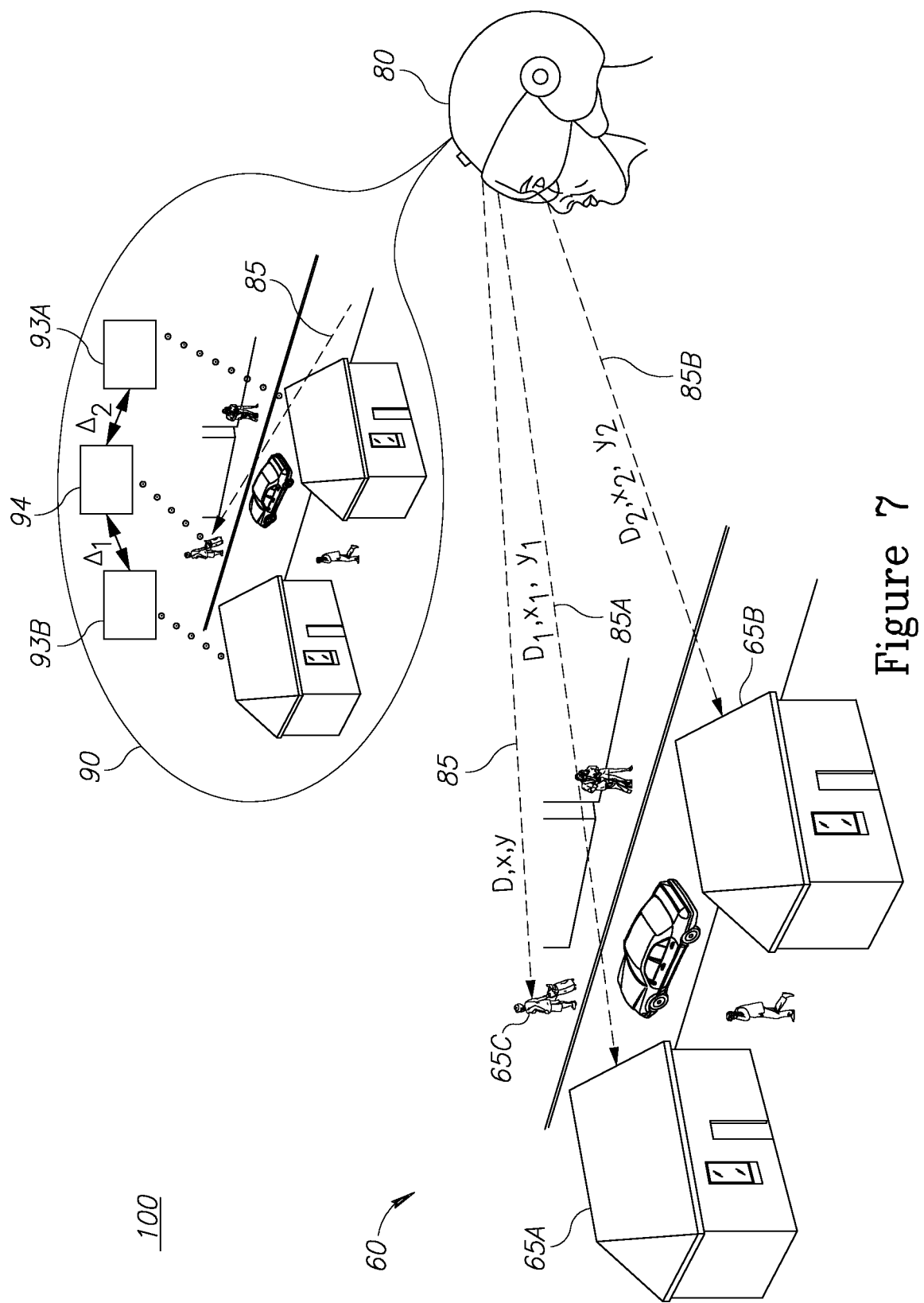
FIG. 7 is a high-level schematic illustration of the system, relating to 3D relations between scene elements, according to some embodiments of the invention.

FIG. 7 is a high-level schematic illustration of system 100, relating to 3D relations between scene elements 65, according to some embodiments of the invention. FIG. 7 illustrates scene 60 with elements 65 such as houses, roads, vehicles, etc., which user 80 observes via e.g., an HMD with display 90 such as a see-through display. System 100, tracking user's LOS 85, may provide additional data 96 related to LOS-designated element 65C, e.g., a person in the figure, and also provide additional enhancement data 93A, 93B concerning other elements 65A, 65B respectively. The relation between data 93A, 93B and data 96 may be derived from real world geometrical parameters, such as distances and positions of the elements from user 80 (e.g., data relating to element 65A at D, $x_1$, $y_1$ along LOS 85A and data relating to element 65B at D, $x_2$, $y_2$ along LOS 85B may be displayed at corresponding distances $\Delta_1$ and $\Delta_2$ on display 90, with respect to data 96 relating to element 65.

Figure 8:
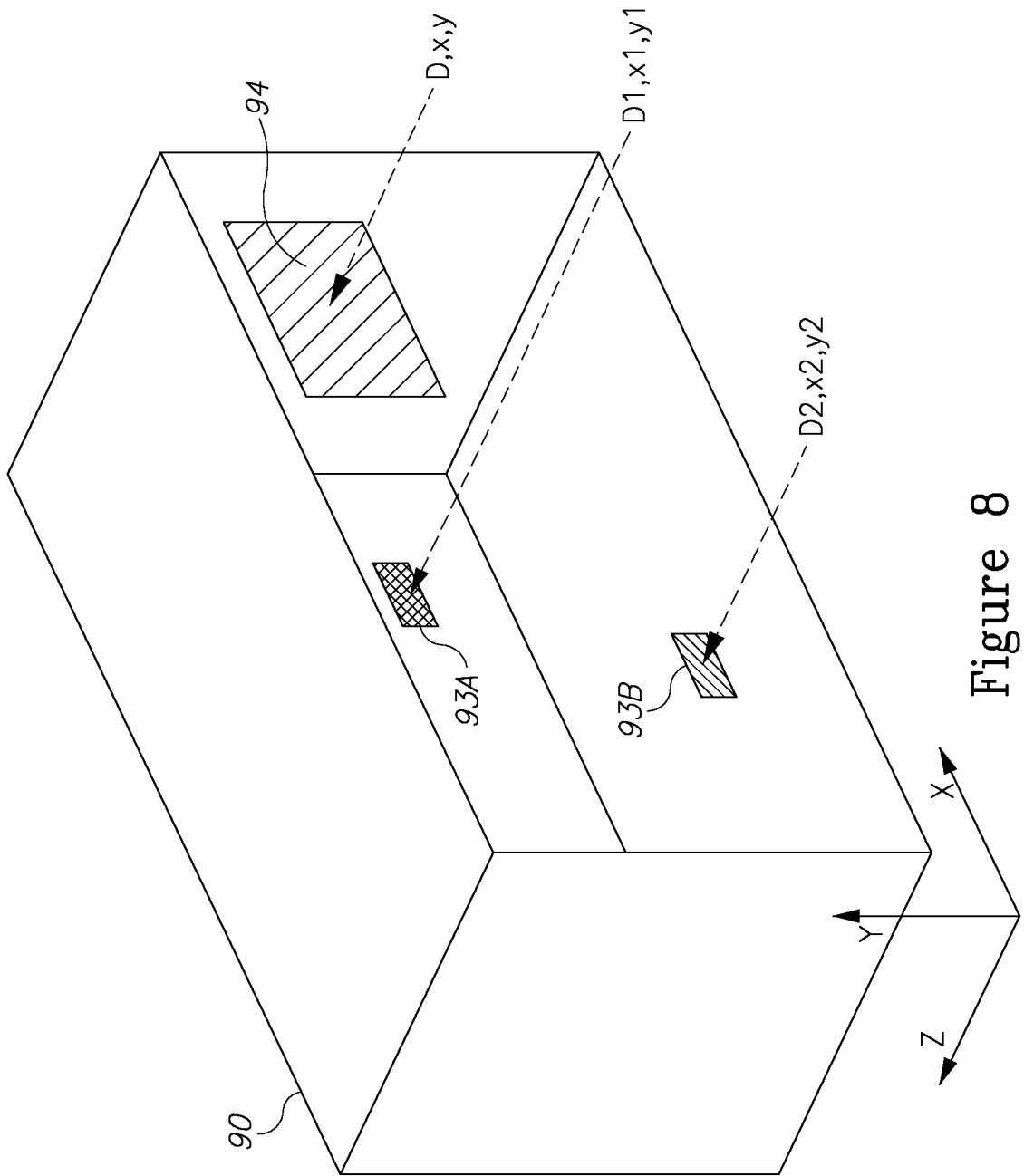
FIG. 8 is a high-level schematic illustration of Three Dimensional (3D) display management, according to some embodiments of the invention.

FIG. 8 is a high-level schematic illustration of 3D display management, according to some embodiments of the invention. Displayed data may be enhanced or attenuated according to its distance in three dimensions (or virtual three dimensions) from a region of interest (ROI). For example, given ROI 94 at coordinates (x, y) and at actual or seeming depth D in 3D display 90, objects 93A, 93B at coordinates (x1, x2) and (y1, y2) and depths D1, D2, respectively may be enhanced or attenuated according to their distances from ROI 94. Different weights may be given to distances in different components, e.g., the depth dimension may be treated differently from the planar dimension. Objects 93A, 93B may be associated with additional interfaces or data that may be activated at certain distances from ROI 94. ROI 94 may be pre-defined or determined according to LOS 85. Objects 93A, 93B may also be selected and/or their display enhanced or attenuated using LOS 85, according to pre-defined rule or according to concurrent instructions (e.g., from the user or other users, using different means). Display of information may be determined by a depth threshold (e.g., beyond which no enhancement data and/or no elements are displayed). 3D display 90 may comprise holograms of one or more elements and/or enhancement data items.

Figure 9A:
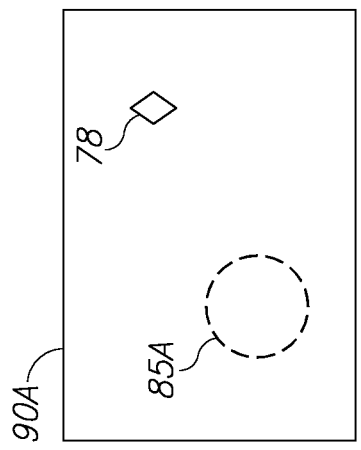
FIGS. 9A and 9B are high-level schematic illustrations of element enhancements, according to some embodiments of the invention.
Figure 9A:
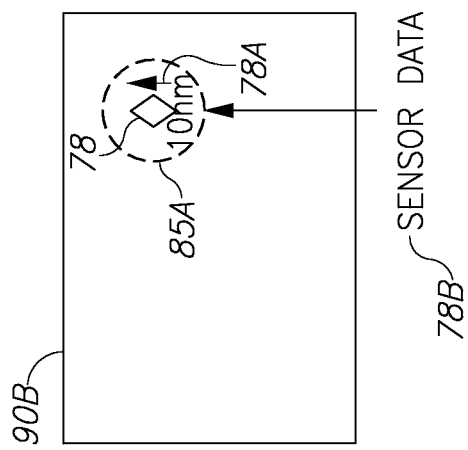
Figure 9A:
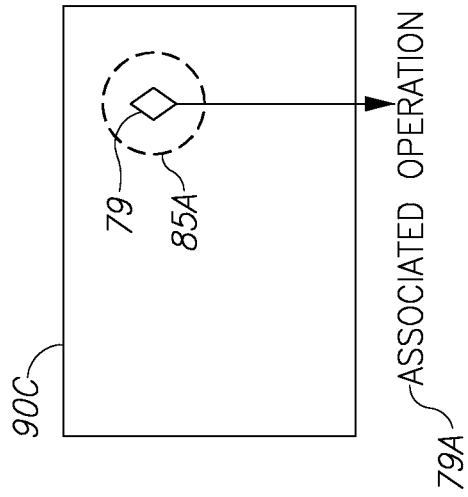
Figure 9B:
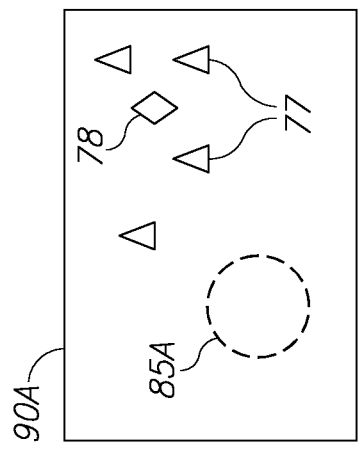
Figure 9B:
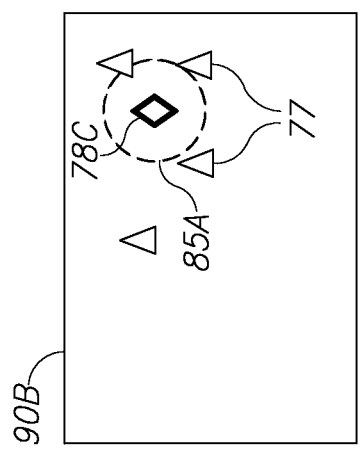
Figure 9B:
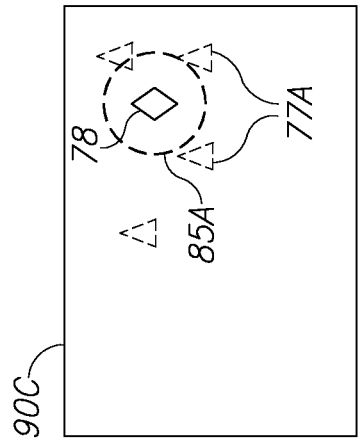

FIGS. 9A and 9B are high-level schematic illustrations of element enhancements, according to some embodiments of the invention. Element 78 may represent one or more element 78, controller(s) 79, instrument(s) 70 or symbols corresponding to instrument(s) 70 and/or element(s) 65 in scene 60, observed through display 90. Broken circle 85A represents the user's gaze. The parameters that determine the size of region 85A that is denoted by gaze 85 may be predefined and/or may be changed depending on various factors such as the type of element 78, its (possibly apparent) location on display 90, operational parameters, user definitions etc., which may be modified during operation e.g., by additional tactile input, user movements or audio input such as voice commands FIG. 9A illustrates in a non-limiting manner the enhancement of one element on display 90. In the examples illustrated in FIG. 9A, user gaze (85A) on element 78 (moving of LOS 85 to designate element 78, changing from display 90A to display 90B) may be used to initiate display of additional information 78A (display 90B, e.g., TCAS data), and/or of additional sensors data 78B or sensor modalities providing information on element 78. In case element 78 represents controller 79 (display 90C, e.g., a specific icon, a predefined region), an associated operation 79A may be activated upon the user's gazing at controller 79. Characteristics of the user's gaze (e.g., duration, proximity to controller 79, repetitions, etc.) may be used to activate controller 79 and/or characterize associated operation 79A or parameters thereof.

FIG. 9A illustrates in a non-limiting manner the enhancement of one element out of multiple elements on display 90. In the examples illustrated in FIG. 9B, element(s) 78, upon the moving of LOS 85 to designate element 78, changing from display 90A to display 90B, may be enhanced visually (78C) upon the user's gazing at it (85A) and thus distinguished better among other elements 77 (display 90B); and/or other elements 77 may be modified, attenuated or removed (77A) upon the user's gazing 85A at element 78 (display 90C). In case elements 77, 78 belong to different information layers 92 or are derived from different data systems or databases 95, elements from the same layer or system as elements 77 may also be modified, attenuated or removed, to enhance information from the layer or system to which element 78 belongs. For example, other elements 77 may be SVS elements while element(s) 78 may be EVS elements, and gazing at one of elements 78 (e.g., over a specified duration) may be defined to result in enhancement of all or some EVS elements 78 and/or removal or attenuation of all or some SVS elements 77, according to user or system definitions. It is noted that in case element 78 is scene element 65, the identity of gazed-at scene element 65 may be used to determine layer 92 or system 95 from which data is displayed, e.g., gazing at a runway as element 65 may be defined to result in display of EVS data while gazing at another aircraft as element 65 may be defined to result in display of information relating to that aircraft. Information from additional sensor systems may be displayed according to user's gazes.

It is explicitly noted that element enhancements may comprise any modifications of the displayed element and/or its surrounding that make the displayed element more prominent and/or augment the information content associated therewith, such as changes to visual parameters of the element (e.g., increased size, brightness, different color, blinking etc.), attenuation of the element's surrounding (e.g., dimming, removing or spacing surrounding elements) and display of additional information related to the displayed element by visual or non-visual means (e.g., presentation of additional data or symbols relating to the element, auditory information). For example, in case of a landing site as the element, it's enhancement may comprise display of additional information, which is not displayed prior to the site's designation by the pilot's gaze or by triggering, such as height, distance, image of site, etc.

Figure 10:
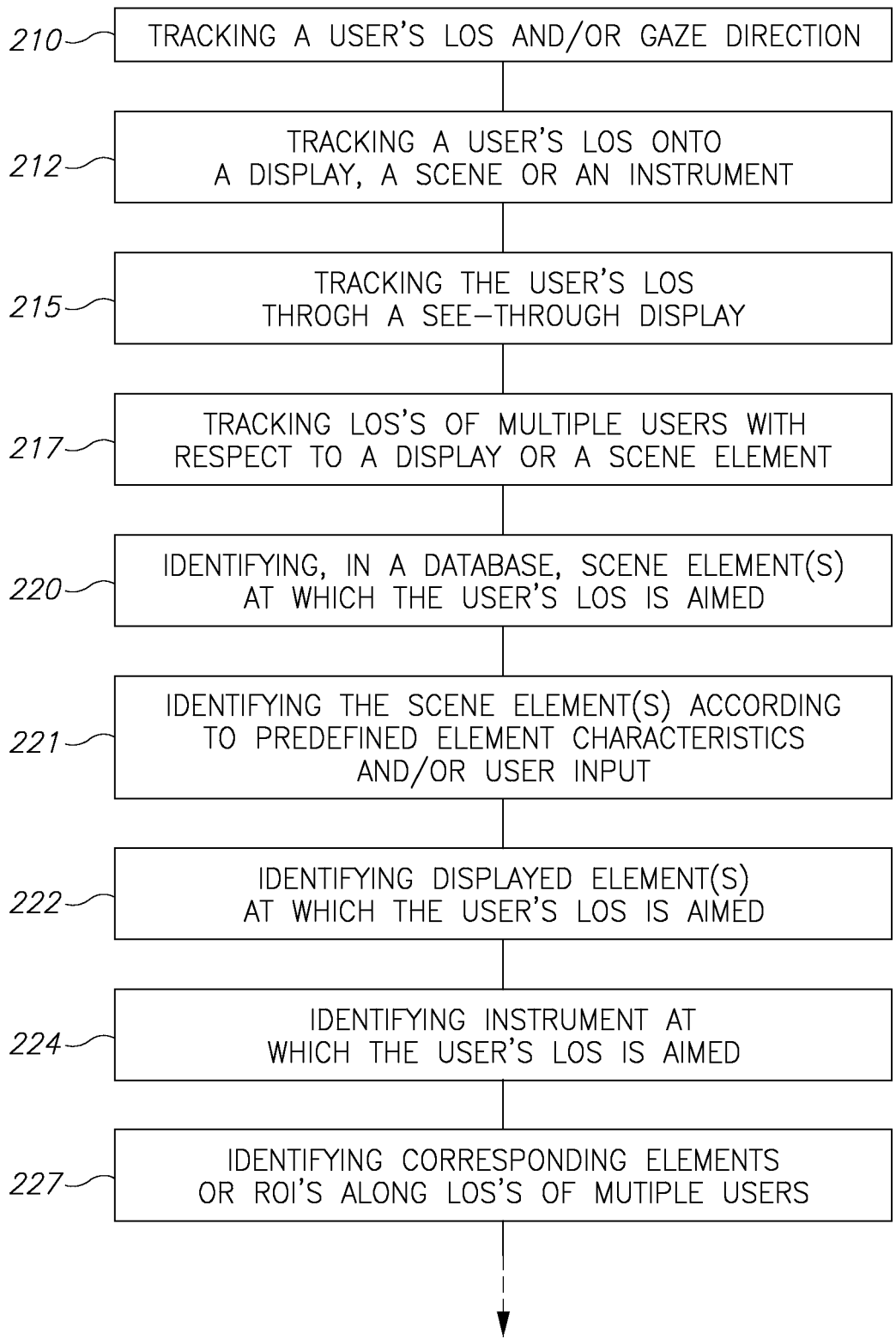
FIG. 10 is a high level flowchart illustrating a method, according to some embodiments of the invention.

FIG. 10 is a high level flowchart illustrating a method 200, according to some embodiments of the invention. At least some of the stages of method 200 may be carried out by at least one computer processor. Stages of method 200 may be implemented in one or more modules, which may be integrated in one or more devices.

In certain embodiments, method 200 may comprise tracking a user's LOS with respect to a scene onto a display (stage 210); identifying, e.g., in a database, one or more element (EOI) in a scene, at which the user gazes (stage 220)—when the identification is carried out in the database, identification 220 may be carried out in a representation of the scene; and enhancing displayed data related to the identified element (stage 230), e.g., upon triggering, for example by displaying selected data relating to the element at which the user gazes (stage 240) such as data selected from a multi-layered database according to a specified user situation (stage 242). Triggering of enhancement 230 may be carried out according to a predetermined condition, specified element characteristics, a user activation, and specified tempo-spatial parameters of the user's LOS (such as LOS designation).

For example, method 200 may comprise identifying the element according to predefined element characteristics (e.g., type of element, element dimensions, data from other information and sensor systems, optical and reflectivity parameters, information from geographic or other databases) and/or according to additional user input (e.g., set definitions, selection etc.) (stage 221).

Enhancing 230 may be carried out by displaying enhancement data relating to the element, such as data from a multi-layered database which is selected according to a specified user situation, sensor data relating to the element, surveillance data relating to the element, data concerning other elements that are associated with or related to the identified element and/or geographical data relating to the element. When identification 220 is carried out with respect to a representation of the scene in the database, the database may be multi-layered and enhancing 230 may comprise enhancement data from the database which are selected according to a specified user situation.

Method 200 may further comprise carrying out at least one action according to any of: a predetermined rule, specified element characteristics, a user prompting and/or specified tempo-spatial parameters of the user's LOS.

In certain embodiments, method 200 may comprise tracking the user's LOS and/or gaze through a see-through display (stage 215), e.g., with respect to a user's operational environment, and displaying the enhancement data conformally to the location of the element on the see-through display (stage 245).

Method 200 may further comprise indicating at least one of the identified element and the enhancement data at a display of another user which is associated with the user (stage 262). The enhancing may be carried out by removing or attenuating other displayed elements (stage 234) and/or modifying other displayed elements according to their relation to the identified element (stage 236), e.g., attenuating the other displayed elements with respect to their distances from the identified element (stage 238).

Method 200 may further comprise receiving user instructions concerning the identified element by identifying predefined changes of the LOS (stage 252). In certain embodiments, method 200 may comprise identifying an instrument within a user's operational environment, at which the user's LOS is aimed (stage 224), displaying an operational interface associated with the identified instrument (stage 250) and optionally receiving user instructions concerning the identified element via the displayed operational interface (stage 252).

In certain embodiments, method 200 may comprise tracking a user's LOS onto a display (stage 212), identifying a displayed element at which the user's LOS is aimed (stage 222) and enhancing the identified element on the display (stage 231) Enhancing displayed elements 231 may be carried out by modifying the displayed elements and/or by removing or attenuating other displayed elements. For example, the displayed element may comprise information layer(s), region(s) of interest and/or object(s) and method 200 may comprise enhancing the identified information layer(s) and/or region(s) of interest and/or object(s) (stage 232) and possibly removing or attenuating (e.g., dimming) other displayed elements (stage 234). Method 200 may further comprise modifying other displayed elements according to their relation to the identified element (stage 236) and optionally attenuating the other displayed elements with respect to their distances from the identified element (stage 238).

Method 200 may further comprise receiving user instructions concerning the identified element by identifying predefined changes of the LOS (stage 252). Method 200 may comprise enhancing the identified EOI (stage 230) by displaying information related to the identified EOI on the see-through display, such as any of: database information associated with the identified EOI, sensor data related to the identified EOI (e.g., from optical or electromagnetic sensors, as well as sensors of associated systems such as TCAS, EVS, various radars, etc.), surveillance data relating to the identified EOI (e.g., from an ADSB system), information relating to other EOI that are related to or associated with the identified EOI, and geographical information relating to the identified EOI (e.g., coordinates, GIS data). In certain embodiments, the displayed information may be selected from a multi-layered database according to a specified user situation and/or according to user definitions.

In certain embodiments, method 200 may comprise tracking a user's LOS (stage 210), identifying an instrument at which the user's LOS is aimed (stage 224), and displaying an operational interface associated with the identified instrument (stage 250). Method 200 may further comprise receiving user instructions concerning the displayed interface by identifying predefined changes of the LOS (stage 252).

In certain embodiments, method 200 may comprise tracking LOS's of multiple users with respect to a display (stage 217), identifying corresponding elements (or ROI's) at which the users' LOS is aimed (stage 227), and exchanging information relating to the gazed-at elements (or ROI's) among the users (stage 260), e.g., by moving elements or ROI's on the display from user to user according to predefined user categories (stage 264).

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for displaying layers of synthetic vision system (SVS) data as a function of a line of sight (LOS) designation of a user within an aircraft, the system comprising:
   a multilayered database comprising a scene representation of a real-world scene and multiple data layers each comprising display data regarding the terrain and/or obstacles in the real-world scene, wherein the multiple data layers are each conformal to the scene representation of the real-world,
   wherein the scene representation is associated with a view through a three-dimensional see-through display, having a depth dimension and a planar dimension, which is used by a user, and
   a control unit comprising a line of sight (LOS) tracker configured to track the user's LOS with respect to the real-world scene, or track the user's LOS relative to the aircraft and convert to LOS relative to the real-world scene,
   wherein the control unit is configured to identify a region of interest (ROI) in the scene representation at which the user's LOS is aimed, and to display, via a display control and on the three-dimensional see-through display, the multiple data layers, wherein the control unit is further configured to select among the multiple data layers according to the ROI and:

attenuate one or more of the multiple data layers, or a part thereof, relative to a remainder of the multiple data layers according to a respective distance thereof in three dimensions from the ROI by varying visual parameters to reduce a prominence of the display data on the attenuated one or more of the multiple data layers, and enhance one or more of the multiple data layers, or a part thereof, relative to a remainder of the multiple data layers according to a respective distance thereof in three dimensions from the ROI by varying visual parameters to increase a prominence of the display data on the enhanced one or more of the multiple data layers.

2. The system of claim 1, wherein the control unit is further configured to carry out the displaying of the one or more data layers when triggered.

3. The system of claim 2, wherein the triggering comprises at least one of: a predetermined condition, specified display element characteristics, a user activation, and specified tempo-spatial parameters of the user's LOS.

4. The system of claim 1, wherein the control unit is further configured to carry out at least one action according to at least one of: a predetermined rule, specified display element characteristics, a user prompting, and specified tempo-spatial parameters of the user's LOS.

5. The system of claim 1, wherein the one or more data layers are selected according to a specified user situation.

6. The system of claim 1, wherein the one or more data layers comprises at least one of: sensor data relating to the ROI, surveillance data relating to the ROI, data concerning other display elements that are associated with or related to the identified ROI, and geographical data relating to the ROI.

7. The system of claim 1, wherein the display of the one or more data layers is conformal to a location of the ROI with respect to the see-through display.

8. The system of claim 1, wherein the control unit is further arranged to carry out the ROI identification with respect to at least one of predefined ROI characteristics and an additional user input.

9. The system of claim 1, wherein the control unit is further configured to indicate at least one of the identified ROI and the one or more data layers at a display of another user which is associated with the user.

10. The system of claim 1, wherein the control unit is further configured to receive user instructions concerning the identified ROI according to predefined changes of the LOS.

11. The system of claim 1, wherein the control unit is further configured to identify an instrument within a user's operational environment, at which the user's LOS is aimed, to display an operational interface associated with the identified instrument and to receive user instructions concerning the identified ROI via the displayed operational interface.

12. A method of displaying layers of synthetic vision system (SVS) data as a function of a line of sight (LOS) designation of a user within an aircraft, the method comprising:

tracking a user's line of sight (LOS) with respect to a real-world scene or tracking the user's LOS relative to the aircraft and converting to LOS relative to the real-world scene, wherein the tracking is carried out with respect to the user's view through a three-dimensional see-through display, having a depth dimension and a planar dimension, that is used by the user, identifying, in a multilayered database, a region of interest (ROI) in a representation of the real-world scene at which the user's LOS is aimed, displaying multiple data layers on the three-dimensional see-through display, wherein each of the multiple data layers comprises display data regarding the terrain and/or obstacles in the real-world scene, wherein the multiple data layers are each conformal to the scene representation of the real-world, and selecting among the multiple data layers according to the ROI, wherein one or more of the multiple data layers, or a part thereof, is attenuated relative to a remainder of the multiple data layers according to a respective distance thereof in three dimensions from the ROI by varying visual parameters to reduce a prominence of the display data on the attenuated one or more of the multiple data layers, and wherein one or more of the multiple data layers, or a part thereof, is enhanced relative to a remainder of the multiple data layers according to a respective distance thereof in three dimensions from the ROI by varying visual parameters to increase a prominence of the display data on the enhanced one or more of the multiple data layers.

13. The method of claim 12, further comprising carrying out the displaying of the one or more data layers when triggered.

14. The method of claim 13, wherein the triggering comprises at least one of: a predetermined condition, specified display element characteristics, a user activation, and specified tempo-spatial parameters of the user's LOS.

15. The method of claim 12, further comprising carrying out at least one action according to at least one of: a predetermined rule, specified display element characteristics, a user prompting, and specified tempo-spatial parameters of the user's LOS.

16. The method of claim 12, wherein the one or more data layers are selected according to a specified user situation.

17. The method of claim 12, wherein the displaying is carried out by displaying information layers relating to the ROI, comprising at least one of: sensor data relating to the ROI, surveillance data relating to the ROI, data concerning other display elements that are associated with or related to the identified ROI, and geographical data relating to the ROI.

18. The method of claim 12, wherein the display of the one or more data layers is conformal to a location of the ROI with respect to the see-through display.

* * * * *